United States Patent
Spix et al.

(10) Patent No.: US 9,739,348 B2
(45) Date of Patent: Aug. 22, 2017

(54) VARIABLE TENSIONER FOR CAM DRIVE

(71) Applicant: GM Global Technology Operations LLC, Detroit, MI (US)

(72) Inventors: Thomas A. Spix, Rochester Hills, MI (US); Roxann M. Bittner, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 14/918,943

(22) Filed: Oct. 21, 2015

(65) Prior Publication Data

US 2017/0114872 A1    Apr. 27, 2017

(51) Int. Cl.
| | |
|---|---|
| F16H 7/22 | (2006.01) |
| F16H 7/08 | (2006.01) |
| F16H 7/06 | (2006.01) |
| F16H 7/02 | (2006.01) |

(52) U.S. Cl.
CPC .............. *F16H 7/08* (2013.01); *F16H 7/02* (2013.01); *F16H 7/06* (2013.01); *F16H 2007/0812* (2013.01); *F16H 2007/0872* (2013.01); *F16H 2007/0885* (2013.01); *F16H 2007/0893* (2013.01); *F16H 2007/0897* (2013.01)

(58) Field of Classification Search
CPC ..... F16H 2007/0859; F16H 2007/0806; F16H 2007/0812; F16H 7/0848; F16H 2007/0891
USPC ......................................................... 474/110
See application file for complete search history.

(56) References Cited

U.S. PATENT DOCUMENTS

| | | | | |
|---|---|---|---|---|
| 4,911,679 A | * | 3/1990 | Inoue ................... | F16H 7/1236 474/110 |
| 5,073,150 A | * | 12/1991 | Shimaya ............... | F16H 7/0848 474/110 |
| 5,181,889 A | * | 1/1993 | Maruyama ............ | F16H 7/1236 474/110 |
| 5,234,383 A | * | 8/1993 | Harada ................. | F16H 7/1236 474/110 |
| 5,352,159 A | * | 10/1994 | Suzuki .................. | F16H 7/08 474/110 |
| 5,366,415 A | * | 11/1994 | Church ................. | F16H 7/0848 474/110 |
| 5,383,813 A | * | 1/1995 | Odai ..................... | F16H 7/129 474/110 |
| 5,607,368 A | * | 3/1997 | Hida ..................... | F16H 7/0848 474/110 |
| 5,720,684 A | * | 2/1998 | Mott ..................... | F16H 7/0848 474/101 |
| 6,045,471 A | * | 4/2000 | Suzuki .................. | F16H 7/08 474/109 |
| 6,086,497 A | * | 7/2000 | Fukuda ................. | F16H 7/0836 474/101 |

(Continued)

*Primary Examiner* — Henry Liu
(74) *Attorney, Agent, or Firm* — Harness, Dickey & Pierce, P.L.C.

(57) ABSTRACT

A tensioner device for a belt or chain defines a housing defining a bore with a plunger disposed in the bore. A spring is engaged with the plunger for biasing the plunger in an outward direction. The housing further includes an oil chamber connected to an oil passage in communication with the oil chamber for delivering pressurized oil to the oil chamber, wherein when the oil chamber is pressurized the pressurized oil applies a counter force opposing a force of the spring.

7 Claims, 2 Drawing Sheets

(56) References Cited

U.S. PATENT DOCUMENTS

Figure 1:
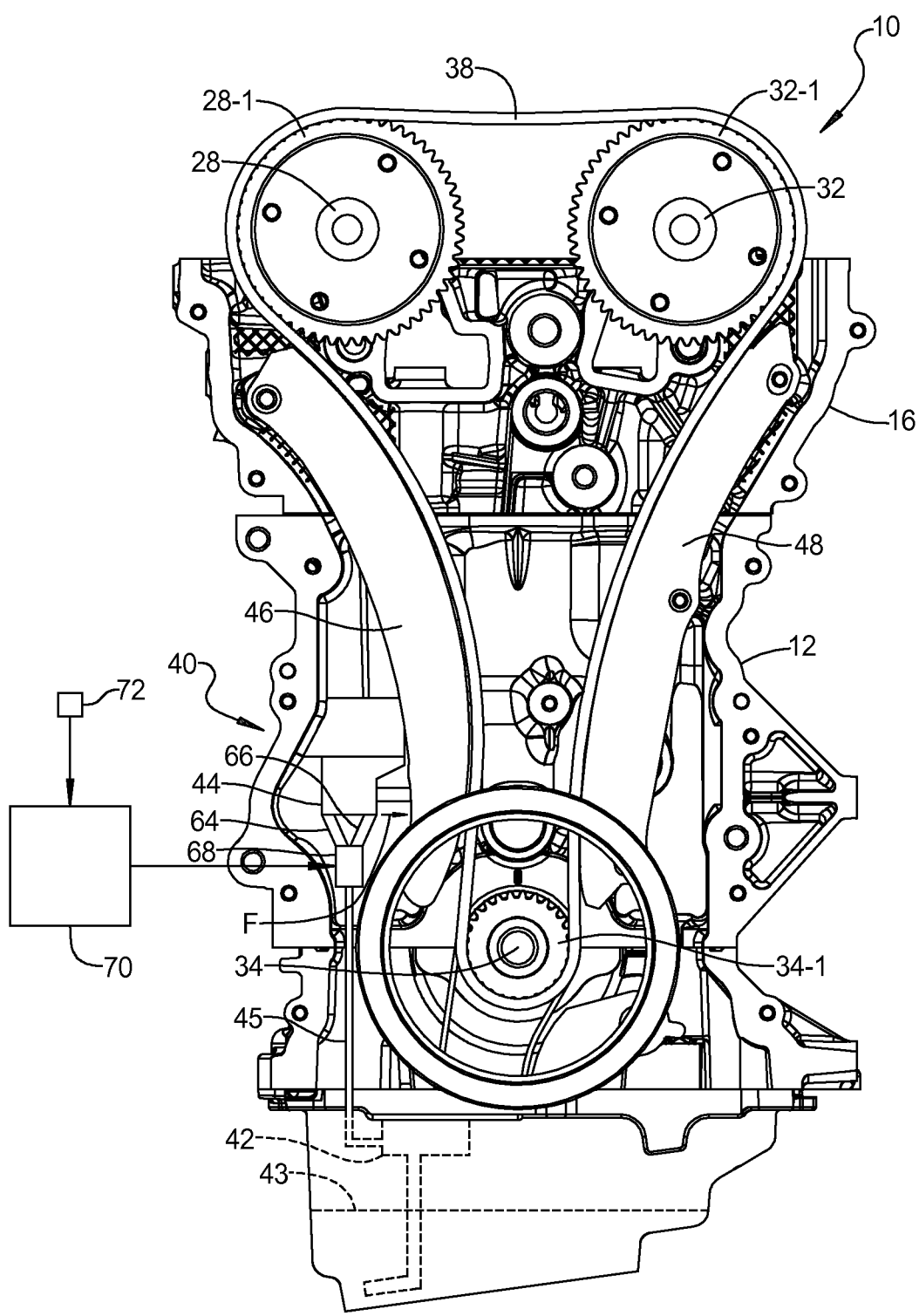

| | | | | |
|---|---|---|---|---|
| 6,196,939 B1* | 3/2001 | Simpson | ............... | F16H 7/0848 |
| | | | | 474/101 |
| 6,471,612 B2* | 10/2002 | Nakakubo | ............. | F16H 7/0836 |
| | | | | 474/109 |
| 6,634,973 B1* | 10/2003 | Simpson | ............... | F16H 7/0848 |
| | | | | 474/109 |
| 2003/0171179 A1* | 9/2003 | Okuda | .................... | F16H 7/129 |
| | | | | 474/110 |
| 2011/0098145 A1* | 4/2011 | Wang | .................... | F16H 7/0836 |
| | | | | 474/110 |
| 2014/0187367 A1* | 7/2014 | Todd | ........................ | F16H 7/08 |
| | | | | 474/110 |
| 2014/0187368 A1* | 7/2014 | Todd | ........................ | F16H 7/08 |
| | | | | 474/110 |
| 2014/0187369 A1* | 7/2014 | Todd | ........................ | F16H 7/08 |
| | | | | 474/110 |

* cited by examiner

VARIABLE TENSIONER FOR CAM DRIVE

FIELD

The present disclosure relates to a variable tensioner for a drive chain or belt in an internal combustion engine, or other industrial machine, and can also be applicable to a balance shaft or oil pump drive system.

BACKGROUND AND SUMMARY

This section provides background information related to the present disclosure which is not necessarily prior art.

An internal combustion engine typically employs camshaft(s) to open and close the engine's valves in order to control a supply of intake air to the cylinder for combustion therein and removal of post-combustion gas therefrom. A camshaft-drive element, such as a timing belt or a timing chain, is frequently used to synchronize the rotation of an engine's crankshaft and camshaft(s) so that the engine's intake and exhaust valves open and close at proper times during each cylinder's intake and exhaust strokes.

A tensioner is frequently used in an engine with either the timing belt or chain. Such a tensioner generally applies a force to the timing belt or chain to maintain the belt or chain in tension and, therefore, the rotational timing between the engine's crankshaft and camshaft(s). The tensioner ensures that, independent of the motion of the belt or chain, the connection between the engine's crankshaft and camshaft(s) remains intact, while limiting stress on the related components.

Current tensioners have a spring within them to load the cam drive system with enough load to control the cam timing at start (low engine speeds) and at high engine speeds. But in the midrange of engine speeds a much lower spring force is required. Accordingly, the present disclosure supplies oil pressure to work against the spring load so at the midrange engine speeds (generally 1000-3000 RPM) a much lower cam drive tension is achieved. By reducing the tension on the drive element at midrange speeds, a reduction in friction can be achieved. Such a friction reduction can result in a fuel economy improvement. In addition, the resultant lower average tension on the cam drive also increases component reliability.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
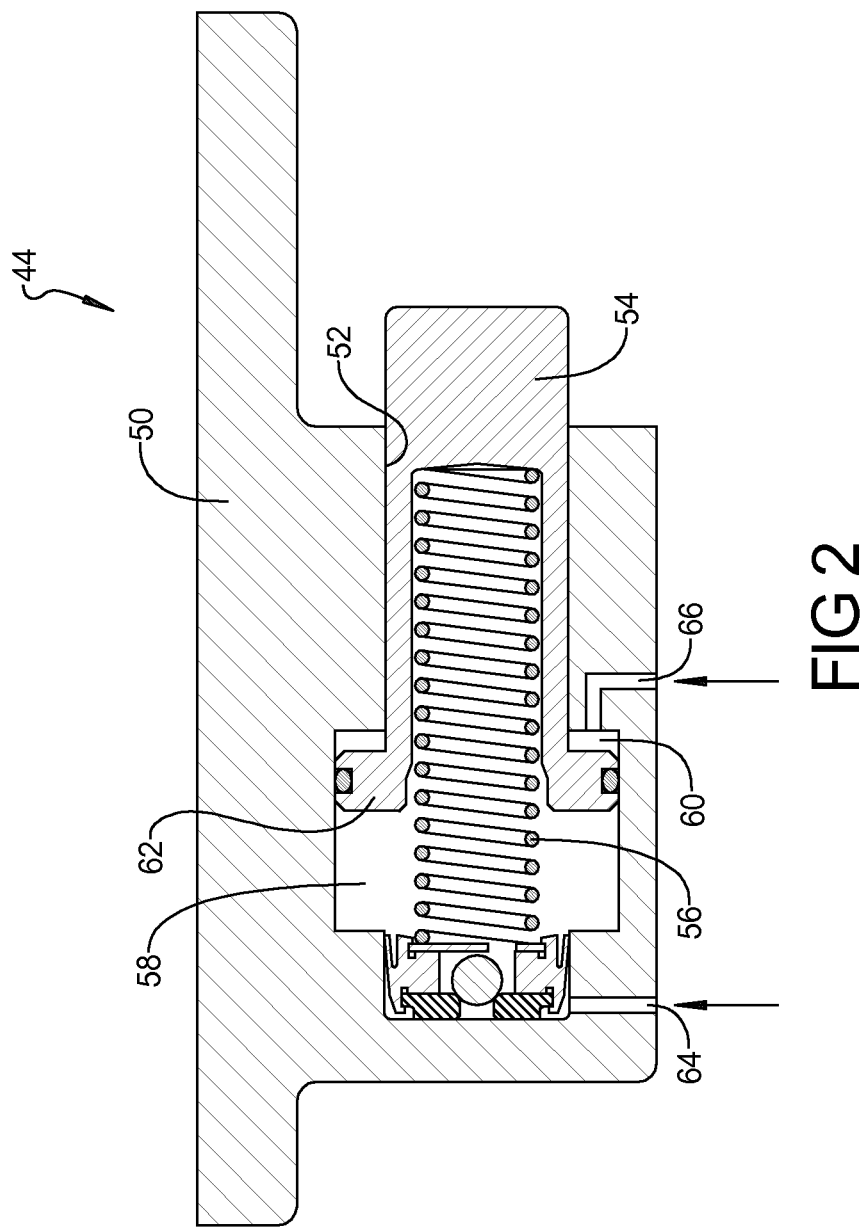

FIG. 1 is a schematic illustration of a belt or chain drive system of an internal combustion engine employing a tensioner device according to the principles of the present disclosure; and FIG. 2 is a schematic illustration of the variable tensioner according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an internal combustion engine 10 including a cylinder block 12 that defines a plurality of cylinders (not shown) arranged therein and a cylinder head 16 that is mounted on the cylinder block 12.

As is known in the art, the cylinder head 16 receives air and fuel as a pre-combustion charge to be used inside the cylinders for subsequent combustion. Each cylinder includes a respective piston configured to reciprocate therein. An airflow is directed through an intake manifold to each of the combustion chambers where fuel is combined with air to form a fuel-air mixture for subsequent combustion inside the combustion chamber. Although an in-line engine is shown in FIG. 1, the present disclosure can be applied to an engine having a different arrangement or any number of cylinders.

As is known in the art, the engine 10 also includes a plurality of intake valves operatively connected to the cylinder head 16 and configured to control a supply of air to each cylinder for combustion with fuel therein. An intake camshaft 28 is configured to regulate opening and closing of the respective intake valves during operation of the engine 10. As is further known in the art, the engine 10 additionally includes a plurality of exhaust valves operatively connected to the cylinder head 16 and configured to control removal of post-combustion gasses from each cylinder. An exhaust camshaft 32 is configured to regulate opening and closing of the respective exhaust valves during operation of the engine 10.

The engine 10 also includes a crankshaft 34 configured to rotate within the cylinder block 12. The crankshaft 34 is rotated by the pistons via connecting rods as a result of an appropriately proportioned amount of fuel and air being selectively admitted into the combustion chambers via one or more intake valves and burned in the combustion chambers. After the air-fuel mixture is burned inside a specific combustion chamber, the reciprocating motion of a particular piston serves to exhaust post-combustion gasses from the respective cylinder via one or more exhaust valves. The cylinder head 16 is also configured to exhaust post-combustion gasses from the combustion chambers, such as via an exhaust manifold.

The intake and exhaust camshafts 28, 32 can each include a respective sprocket or pulley 28-1, 32-1, while the crankshaft 34 can include a sprocket or pulley 34-1. The engine 10 also includes a closed loop shaped camshaft-drive element 38, such as a timing belt (not shown) or a chain (as shown in FIG. 1). The camshaft-drive element 38 operatively connects the respective sprockets/pulleys 28-1, 32-1, and 34-1 to thereby synchronize rotation of the crankshaft 34 and camshafts 28, 32. The synchronized rotation of the engine's crankshaft 34 and camshafts 28, 32 via the camshaft-drive element 38 ensures that the intake and exhaust valves open and close at proper times during each cylinder's intake and exhaust strokes and may additionally maintain safe running clearance between the valves and pistons.

The engine 10 additionally includes a camshaft-drive element tensioner system 40. The camshaft-drive tensioner system 40 includes a fluid pump 42 configured to supply a pressurized fluid 43, such as engine lubrication oil. The fluid pump 42 may be driven mechanically by the engine 10, such as by the crankshaft 34, or via an electric motor (not shown). The fluid pump 42 may be configured to supply oil for lubricating various bearings (not shown) of the engine 10, such as bearings of the crankshaft 34, of the intake and exhaust camshafts 28, 32, and to other engine sub-systems. The camshaft-drive tensioner system 40 also includes a tensioner 44 configured to apply a force F to the camshaft-drive element 38.

The fluid pump 42 supplies a pressurized fluid 43 to the tensioner 44 via a fluid passage 45 that will be discussed in detail below. The tensioner 44 becomes energized by the pressurized fluid 43 from the fluid pump 42 to thereby apply the force F to the camshaft-drive element 38. As shown, a pivotable tensioner arm 46 may be arranged between the tensioner 44 and the camshaft-drive element 38. The tensioner arm can be in the form of a plate or pulley, or other known tensioning device. The tensioner arm 46 is configured to transmit the force F from the tensioner 44 along an extended span of the camshaft-drive element 38, to thereby guide and reduce stress on the camshaft-drive element 38 during operation of the engine 10. A fixed arm 48 can also be employed to guide an opposite side of the camshaft-drive element 38, as shown in FIG. 1.

The force F applied by the tensioner 44 to the camshaft-drive element 38 is intended to maintain predetermined tension in the subject camshaft-drive element 38 and, therefore, the rotational timing between the crankshaft 34 and camshafts 28, 32. The tensioner 44 applies the force F continuously to ensure that motion of the camshaft-drive element 38 remains controlled under various engine speeds.

With reference to FIG. 2, the tensioner 44 includes a housing 50 defining a bore 52. A plunger 54 is disposed in the bore 52. A spring 56 is engaged with the plunger 54 for biasing the plunger 54 in an outward direction toward the tensioner arm 46. The housing 50 includes a first oil chamber 58 on an inboard side of the plunger 54 and a second oil chamber 60 disposed on an outboard side of a plunger flange 62. A first oil passage 64 is connected to the first oil chamber 58 and a second oil passage 66 is connected to the second oil chamber 60. The first and second oil passages 64, 66 are selectively supplied with pressurized fluid from a control valve 68.

As shown in FIG. 1, the camshaft-drive tensioner system 40 includes a controller 70 configured to control the control valve 68 for selectively supplying pressurized fluid to either the first oil chamber 58 or the second oil chamber 60. The pressurized fluid supplied to the first oil chamber 58 tends to add additional force to the tensioner in addition to the spring force applied by the spring 56. The pressurized fluid supplied to the second oil chamber 60 tends to oppose the spring force applied by the spring 56 so as to reduce the force F applied to the tensioner arm 46. The controller 70 may be a dedicated controller for the engine 10, a controller for a powertrain of the vehicle that includes both the engine 10 and a transmission, or a central processing unit for an entire motor vehicle. The controller 70 includes a memory, at least some of which is tangible and non-transitory. The controller 70 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 70 or accessible thereby may be stored in the memory and automatically executed to provide the required functionality.

Specifically, the controller 70 is programmed to selectively control the control valve 68 to supply pressurized fluid to either the first or second oil passage 64, 66 and thereby the first oil chamber 58 or the second oil chamber 60. Accordingly, the supply of pressurized fluid to the first oil chamber 58 can add additional tension force to the camshaft drive element 38 while the supply of pressurized fluid to the to the second oil chamber 60 can oppose the spring force to reduce the force applied to the camshaft-drive element 38 by the tensioner 44.

The camshaft-drive tensioner system 40 may also include a sensor 72 in operative communication with the controller 70 and configured to detect a rotating speed of the engine 10. Specifically, the sensor 72 may be configured as a sensor for detecting a rotating speed of the crankshaft 34. The controller 70 may be configured to deliver the pressurized fluid 43 to either of the first and second oil chambers 58, 60 of the tensioner 44 in response to the rotating speed of the engine 10 detected by the sensor 72. Thus, the applied force F of the tensioner 44 can be varied depending upon the engine speed. By way of non-limiting example, at start-up (low engine speed) and at high engine speeds, the tensioner can be supplied with pressurized fluid to provide additional tension force to the tensioner arm so that a sufficient amount of tension control is applied to the camshaft-drive element 38. In the midrange of engine speeds, such as from 1000 to 3000 RPM, a lower tension force is required for proper camshaft-drive element control. Accordingly, the controller 70 can control the control valve 68 to supply pressurized fluid to the second oil chamber 60 so that the pressurized fluid applies a force counter to the spring force applied by the spring 56 such that the tension on the camshaft-drive element 38 and the resultant friction detrimental to operating efficiency of the engine 10 can be reduced at the midrange engine speeds. In particular, testing of the present system has shown a small reduction in friction in the camshaft-drive element, which on a small 4 cylinder engine results in a small increase in fuel economy. In addition, the resultant lower average tension on the cam drive also increases component reliability.

The fluid control valve 68 may be a multi-position valve that can be selectively operated to supply the pressurized fluid to either of the first or second oil chambers 58, 60 or alternatively neither oil chamber so that only the spring force is applied to the tensioner. The fluid control valve 68 can take the form of a single valve or a combination of valves.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tensioner device for tensioning a closed loop-type drive element, comprising:
   a housing defining a bore;
   a plunger disposed in said bore, said plunger including a hollow portion and a radially extending flange;
   a spring engaged within the hollow portion of the plunger for biasing the plunger in an outward direction;
   the housing including a first oil chamber disposed on a first side of the radially extending flange and connected to a first oil passage in communication with the first oil chamber for delivering pressurized oil to the first oil chamber, wherein when the first oil chamber is pressurized the pressurized oil applies a counter force opposing a force of the spring, the housing including a second oil chamber disposed on a second side of the radially extending flange and in communication with the hollow portion of the plunger and connected to a second oil passage in communication with the second oil chamber for delivering pressurized oil to the second oil chamber, wherein when the second oil chamber is pressurized the pressurized oil applies a force adding to the force of the spring, wherein the closed loop drive element is engaged with a plurality of pulleys or sprockets of an internal combustion engine and further comprising a controller for detecting a rotational speed of the internal combustion engine and a control valve selectively controlled by the controller for selectively supplying the pressurized oil to one of the first and second oil chambers when the internal combustion engine is operated in predetermined speed ranges.

2. The tensioner device according to claim 1, further comprising a tensioning arm that is engaged with the plunger.

3. The tensioner device according to claim 2, wherein the tensioning arm is adapted to engage a belt or chain for applying a tension force there against.

4. A chain drive system, comprising:
   a first sprocket;
   a second sprocket;
   a chain drivingly engaged with the first and second sprockets; and
   a tensioner device having a housing defining a bore, a plunger disposed in said bore, said plunger including a hollow portion and a radially extending flange, a spring engaged within the hollow portion of the plunger for biasing the plunger in an outward direction, the housing including a first oil chamber disposed on a first side of the radially extending flange and connected to a first oil passage in communication with the first oil chamber for delivering pressurized oil to the first oil chamber, wherein when the first oil chamber is pressurized the pressurized oil applies a counter force opposing a force of the spring, the housing including a second oil chamber disposed on a second side of the radially extending flange and in communication with the hollow portion of the plunger and connected to a second oil passage in communication with the second oil chamber for delivering pressurized oil to the second oil chamber, wherein when the second oil chamber is pressurized the pressurized oil applies a force adding to the force of the spring, wherein the closed loop drive element is engaged with a plurality of pulleys or sprockets of an internal combustion engine and further comprising a controller for detecting a rotational speed of the internal combustion engine and a control valve selectively controlled by the controller for selectively supplying the pressurized oil to one of the first and second oil chambers when the internal combustion engine is operated in predetermined speed ranges.

5. The chain drive system according to claim 4, further comprising a tensioning arm that is engaged with the plunger and the chain for applying a tension force against the chain.

6. A belt drive system, comprising:
   a first pulley;
   a second pulley;
   a belt drivingly engaged with the first and second pulleys; and
   a tensioner device having a housing defining a bore, a plunger disposed in said bore, said plunger including a hollow portion and a radially extending flange, a spring engaged within the hollow portion of the plunger for biasing the plunger in an outward direction, the housing including a first oil chamber disposed on a first side of the radially extending flange and connected to a first oil passage in communication with the first oil chamber for delivering pressurized oil to the first oil chamber, wherein when the first oil chamber is pressurized the pressurized oil applies a counter force opposing a force of the spring, the housing including a second oil chamber disposed on a second side of the radially extending flange and in communication with the hollow portion of the plunger and connected to a second oil passage in communication with the second oil chamber for delivering pressurized oil to the second oil chamber, wherein when the second oil chamber is pressurized the pressurized oil applies a force adding to the force of the spring, wherein the closed loop drive element is engaged with a plurality of pulleys or sprockets of an internal combustion engine and further comprising a controller for detecting a rotational speed of the internal combustion engine and a control valve selectively controlled by the controller for selectively supplying the pressurized oil to one of the first and second oil chambers when the internal combustion engine is operated in predetermined speed ranges.

7. The belt drive system according to claim 6, further comprising a tensioning arm or pulley that is engaged with the plunger and the belt for applying a tension force against the belt.

* * * * *